Sept. 8, 1942.　　　W. L. KEEHN　　　2,295,084
TRAILER TRUCK
Filed Oct. 2, 1940　　2 Sheets-Sheet 2
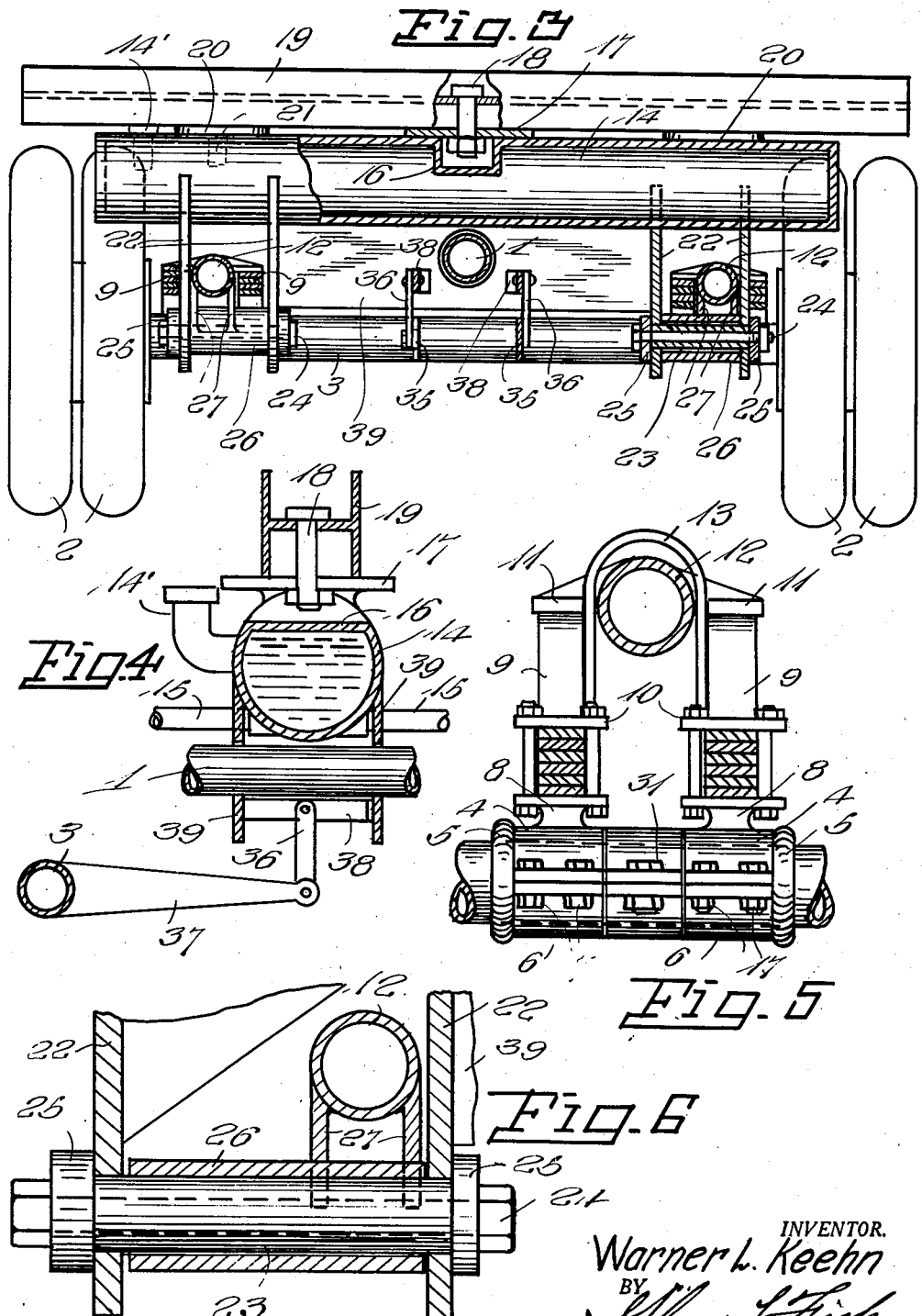
INVENTOR.
Warner L. Keehn
BY
ATTORNEY.

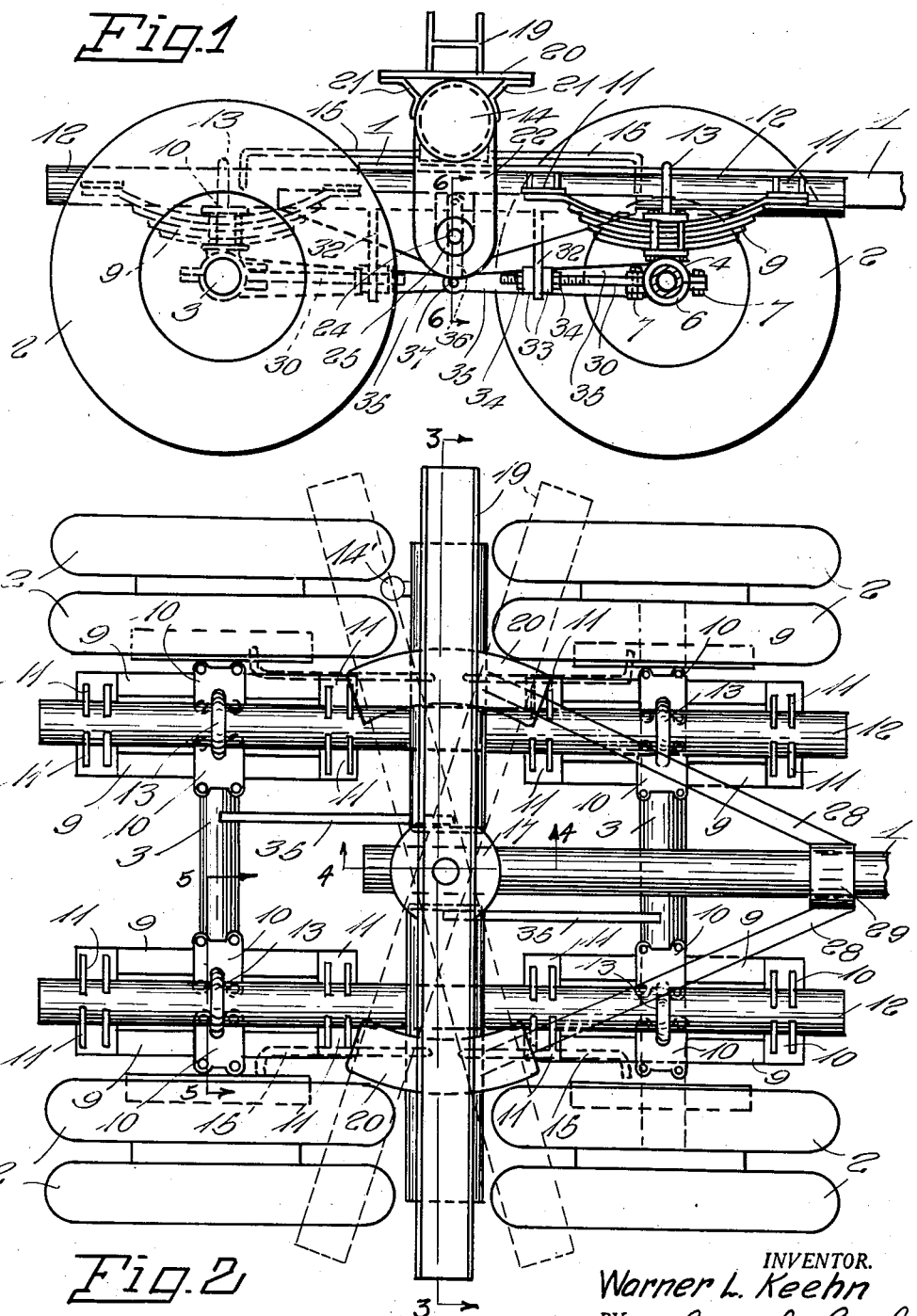

Patented Sept. 8, 1942

2,295,084

UNITED STATES PATENT OFFICE 2,295,084

TRAILER TRUCK

Warner L. Keehn, Spokane, Wash.

Application October 2, 1940, Serial No. 359,447

4 Claims. (Cl. 280—124)

This invention relates to a trailer and more particularly to a truck for a trailer of the type used in lumber camps for hauling large logs but it is to be understood that the improved truck may form part of other vehicles used for carrying heavy loads.

One object of the invention is to provide a truck having an improved undercarriage carrying the axles upon which the wheels are mounted.

Another object of the invention is to provide the truck with an improved arrangement of springs so mounted that the axles carrying the wheels may have tilting movement and thus allow the wheels carried by the axles to follow uneven places in a logging road or the like.

Another object of the invention is to provide a truck having its axles braced against strains longitudinally of the truck and thus prevented from being distorted and damaged during use of a trailer equipped with trucks of the improved construction.

Another object of the invention is to provide a truck wherein a tank constituting a reservoir for water or other liquid for hydraulic brakes serves as a mounting for a bunk or bolster upon which a log, vehicle body, or other load rests.

Another object of the invention is to provide a truck which is very strong and serviceable and capable of being connected with a companion truck by a reach pole or equipped with a pole or tongue for connection with a tractor or other power vehicle by means of which the trailer is drawn forwardly when in use.

In the accompanying drawings:

Fig. 1 is a view showing the truck partially in side elevation and partially in section.

Fig. 2 is a top plan view of the truck.

Fig. 3 is a sectional view taken transversely through the truck on the line 3—3 of Fig. 2.

Fig. 4 is a fragmentary sectional view on the line 4—4 of Fig. 2.

Fig. 5 is a fragmentary sectional view on the line 5—5 of Fig. 2.

Fig. 6 is a fragmentary sectional view on the line 6—6 of Fig. 1.

This improved truck or trailer unit may constitute one of a pair which are connected by a reach pole 1, or it may constitute the chassis or undercarriage of a small trailer such as the type hitched in the rear of an automobile and used for hauling baggage.

The trailer truck or unit has front and rear wheels 2 which may be in pairs, as shown, or single wheels according to the load capacity of the truck. The wheels are carried by axles 3 which pass through bearings 4 located between rings or collars 5 welded to the axles in such spaced relation to each other that the bearing sleeves are located between them, as shown in Fig. 5, and the axles are thus prevented from shifting longitudinally through the bearings out of proper position. The bearings have lower sections 6 which are detachably secured by bolts 7, so that they may be removed when applying the bearings to the axles and then replaced and firmly secured. Brackets 8 extend upwardly from the bearings and on these brackets rest leaf springs 9 which are firmly held in place by clamps 10. Ends of the leaf springs 9 are engaged by brackets 11 which are welded to tubular bars 12 extending longitudinally of the trailer truck adjacent opposite sides thereof. Yokes 13 of U-shape straddle the side bars with lower portions of their arms secured to brackets 10. These yokes brace the side bars against transverse movement but permit vertical movement thereof.

A cylindrical tank 14 having a filling neck 14' and constituting a reservoir for liquid which is delivered through tubes or pipes 15 to hydraulic brakes (not shown), extends transversely of the truck midway the length thereof, over the tubes 12, to serve as a bolster and, at its center, this tank is formed with a depressed portion 16 bridged by a bearing disc 17 through the center of which passes a bolt or king pin 18. This king pin pivotally holds a bunk 19 in place and allows the truck to have turning movement when a heavy log or other load is resting on the bunk. Arcuate bearing plates 20, supported by arms 21 which project from opposite sides of the tank intermediate the depressed portion 16 and ends of the tank, serve as supports for the tank and prevent it from tilting vertically during turning movement of the truck. Plates 22 constituting arms or brackets extend downwardly from the tank near opposite ends thereof. These arms or brackets 22 are arranged in pairs spaced from each other and having their lower ends formed with openings to receive ends of a tube 23 held in place by a bolt 24 carrying washers 25 which bear against outer side faces of the brackets. A sleeve 26 fits about each tube 23 and these sleeves are welded to elongated flanges or side plates 27 which extend downwardly from inner and outer side portions of the two side bars 12. It will thus be seen that the tank which serves as a support for the bolster or bunk 19 will be connected with the side bars 12 to which ends of the springs 9 are anchored and that when the trailer or truck is moving along a rough road the chassis portion thereof may have spring-controlled vertical movement relative to the axles. The reach bar 1 is braced by diagonally extending braces 28 carrying a collar 29 which fits about the reach bar. End portions of these axles are braced by rods 30 which are carried by sectional collars 31 fitting loosely about the axles between the bearings 4 and having threaded end portions. These end portions pass through plates or brackets 32 mounted between and extending downwardly below the side flanges 27 of the tubular side bars 12. Rubber pads or bumpers 33 fit about the rods and are compressed into tight contacting engagement with opposite side faces of the plates 32 by nuts 34. It will thus be seen that while the rods will brace the axles, they will permit a certain amount of give. As additional bracing means for the axles, there have been provided braces 35 which may be referred to as center braces. These center braces are welded to the two axles and extend laterally therefrom longitudinally of the truck, as shown in Fig. 2. Their inner ends are pivoted to links 36 by pins 37, as shown in Fig. 4, and these links extend vertically with their upper ends secured to brackets 38 mounted between plates 39. These plates are welded to the tank 14 along opposite side portions thereof and extend downwardly from the tank, as shown in Fig. 4, in bracing engagement with the brackets 22. The reach bar 1 extends through openings 40 formed through plates 39 in alinement with each other. I have, therefor, provided a truck or trailer which is of simple construction and light weight but very strong and durable and capable of supporting a heavy load and of being subjected to rough usage without parts being broken or otherwise damaged.

Having thus described the invention, what is claimed is:

1. A trailer comprising side bars, springs extending longitudinally of the side bars at opposite sides thereof, brackets carried by the side bars and slidably engaging end portions of said springs, yokes straddling the side bars, clamps carrying said yokes and secured about the springs intermediate the length thereof, bearings carried by said clamps, axles passing through said bearings, wheels carried by said axles, a bolster, a bunk pivoted on the bolster, bracing plates depending from the bolster, a reach bar between the side bars having a portion passing through said plates, links mounted vertically between the bracing plates and extending downwardly therefrom, arms extending laterally from said axles and pivoted to lower ends of said links, flanges extending downwardly from the side bars, supports carried by said flanges, bracing rods having collars mounted about the axles, said rods having threaded end portions secured through the supports, side brackets extending downwardly from said bolster at opposite sides of the side bars, sleeves carried by the flanges of the side bars and disposed between the side brackets, and fasteners passing through the sleeves and connecting the sleeves with the brackets.

2. A trailer truck comprising axles, leaf springs extending transversely of the axles and arranged in pairs adjacent opposite sides of the truck, the springs of each pair being spaced transversely from each other, bearings fitting about the axles and arranged in pairs under the springs, clamps carried by the bearings and secured about midsections of the springs, side bars extending longitudinally of the truck between spaced springs to dispose the springs longitudinally of the side bars at opposite sides thereof, brackets carried by said side bars at opposite sides thereof and slidably engaging ends of the springs, yokes straddling the side bars and secured to the clamps, plates extending downwardly from the side bars between the axles, sleeves fitting loosely about the axles between companion bearings, rods carried by said sleeves and extending longitudinally of the truck, said rods having portions passing through the plates, cushioning members carried by said rods and engaging opposite faces of the plates, a bolster extending transversely of the truck over the side bars, and a bunk over the bolster mounted for pivotal movement.

3. A trailer truck comprising axles, side bars over end portions of the axles, springs mounted between the axles and the side bars, a bolster extending transversely of the truck intermediate the length thereof, flanges extending downwardly from the side bars at opposite sides thereof, brackets extending downwardly from said bolster and arranged in pairs adjacent opposite ends thereof with the brackets of each pair spaced from each other longitudinally of the bolster and the adjacent side bar disposed between the spaced brackets, sleeves fixed to lower ends of said flanges and extending transversely of the side bars and located between lower portions of pairs of companion brackets, bushings extending through said sleeves with their ends passing through companion brackets, bolts passing through openings in lower portions of the bushings and carrying washers for engaging outer side faces of the brackets to hold the brackets in place for supporting the bolster over the side bars in vertical spaced relation to the side bars, and a bunk extending longitudinally of the bolster and pivotally supported thereon.

4. A trailer truck comprising axles, side bars over the axles, springs mounted between the axles and the side bars, a bolster extending transversely of the truck intermediate the length thereof, flanges extending downwardly from the side bars at opposite sides thereof, brackets extending downwardly from said bolster and arranged in pairs adjacent opposite ends thereof, sleeves fixed to lower ends of said flanges and fitting between pairs of companion brackets, bushings extending through said sleeves with their ends passing through companion brackets, bolts passing through the bushings and carrying washers for engaging side faces of the brackets to hold the brackets in place for supporting the bolster in vertical spaced relation to the side bars, a bunk extending longitudinally of the bolster and at its center mounted for pivotal movement, bracing plates extending downwardly from said bolster along opposite sides thereof, mounting members between the bracing plates, links disposed vertically with their upper ends secured to the mounting members, and arms fixed to the axles and extending laterally therefrom longitudinally of the truck and pivoted to lower ends of the links.

WARNER L. KEEHN.